US008447985B2

(12) United States Patent
Ziener et al.

(10) Patent No.: US 8,447,985 B2
(45) Date of Patent: May 21, 2013

(54) WATERMARKING APPARATUS, SOFTWARE ENABLING AN IMPLEMENTATION OF AN ELECTRONIC CIRCUIT COMPRISING A WATERMARK, METHOD FOR DETECTING A WATERMARK AND APPARATUS FOR DETECTING A WATERMARK

(75) Inventors: Daniel Ziener, Erlangen (DE); Juergen Teich, Erlangen (DE)

(73) Assignees: Fraunhofer-Gesellschaft zur Foerderung der Angewandten Forschung E.V., Munich (DE); Friedrich-Alexander-Universitaet Erlangen-Nuernberg, Erlangen (DE)

( * ) Notice: Subject to any disclaimer, the term of this patent is extended or adjusted under 35 U.S.C. 154(b) by 1753 days.

(21) Appl. No.: 11/551,213

(22) Filed: Oct. 19, 2006

(65) Prior Publication Data
US 2007/0220263 A1 Sep. 20, 2007

(30) Foreign Application Priority Data

Mar. 17, 2006 (EP) .................................... 06005526

(51) Int. Cl.
H04L 9/32 (2006.01)
(52) U.S. Cl.
USPC .......................................... 713/176; 382/100
(58) Field of Classification Search
USPC .......................................... 713/176; 382/100
See application file for complete search history.

(56) References Cited

PUBLICATIONS

Lach et al. "Signature Hiding Techniques for FPGA Intellectual Property Protection", pp. 1-4.*
Ziener et al. "Evaluation of Watermarking methods for FPGA-based IP-cores", University of Erlangen-Nuremberg, Mar. 2005.*
Fan et al. "Watermarking for Intellectual property protection", Electronics Letters, 2003, pp. 1-2.*
Fan et al. "Watermarking Based IP Core Protection", 2003, pp. 181-184; IEEE, 2003.*
Ziener D. et al; "Evaluation of Watermarking Methods for FGPA-based IP-Cores"; Department of Computer Science 12 Hardware-Software-Co-Design; University of Erlangen-Nuremberg Am Weichselgarten 3; Erlangen, Germany; Mar. 1, 2005.
Y.C. Fan and H.W. Tsao; Watermarking for Intellectual Property Protection; Electronic Letters; vol. 39 No. 18; Sep. 4, 2003.
L. Boney et al., "Digital Watermarks for Audio Signals", International Conference on Multimedia Computing and Systems, Mar. 27, 1996, pp. 1-16.
Xilinx, Inc., "Next-Generation Virtex Family from Xilinx to Top One Billion Transistor Mark", Xilinx Press Release No. 03131, Sep. 15, 2003, San Jose, CA, pp. 1-2.
L. Shang et al., "Dynamic Power Consumption in Virtex™-II FPGA Family", FPGA '02, Feb. 24-26, 2002, Monterey, CA, pp. 157-164.
A. Kahng, "Contraint-Based Watermarking Techniques for Design IP Protection", IEEE Transactions on Computer-Aided Design of Integrated Circuits and Systems, vol. 20, No. 10, Oct. 2001, pp. 1236-1252.

(Continued)

*Primary Examiner* — Shewaye Gelagay
(74) *Attorney, Agent, or Firm* — Glenn Patent Group; Michael A. Glenn

(57) ABSTRACT

A watermarking apparatus for an electronic circuit is described, which comprises the following features: a watermark memory operative to store a watermark characterizing said electronic circuit, and a watermarking signal generator operative to generate based on said watermark a watermarking signal on a power supply line of said electronic circuit, wherein said watermarking signal is detectable for a recognition of said watermark.

18 Claims, 7 Drawing Sheets

PUBLICATIONS

A. Kahng et al., "Robust IP Watermarking Methodologies for Physical Design", Proceedings of the 35th Conference on Design Automation, San Francisco, CA, pp. 782-787, Jun. 15-19, 1998, ACM Press, ISBN:0-89791-964-5.

D. Agrawal, "The EM Side-Channel(s): Attacks and Assessment Methodologies", Cryptographic Hardware and Embedded Systems, CHES 2002: $4^{th}$ International Workshop, Redwood Shores, CA, Aug. 13-15, 2002, vol. 2523/2003, pp. 1-42.

A. Chandrakasan, "Low Power CMOS Digital Design", IEEE Journal of Solid-State Circuits, vol. 27, No. 4, Apr. 1992, pp. 1-18.

D. Kirovski et al., "Intellectual Property Protection Using Watermarking Partial Scan Chains for Sequential Logic Test Generation", Design Automation Conference 2002 Proceedings, Jun. 10-14, 2002, pp. 1-4.

D. Kirovski et al., "Intellectual Property Protection by Watermarking Combinational Logic Systesis Solutions", Computer-Aided Design, 1998; ICCAD 98; Digest of Technical Papers 1998; IEEE/ACM International Conference on Publication, Nov. 8-12, 1998, pp. 194-201, ISBN: 1-58113-008-2.

P. Kocher et al., "Differential Power Analysis", Lecture Notes in Computer Science; vol. 1666 archive, Proceedings of the 19th Annual International Cryptology Conference on Advances in Cryptology, 1999, pp. 1-10.

J. Lach, "Signature Hiding Techniques for FPGA Intellectual Property Protection", Computer-Aided Design 1998; ICCAD 98; Digest of Technical Papers 1998; IEEE/ACM International Conference on Publication Nov. 8-12, 1998, pp. 186-189, ISBN: 1-58113-008-2.

Yu-Cheng, Fan et al. "Watermarking based IP Core Protection." Proceedings of the IEEE International Symposium on Circuits and Systems, vol. 5, pp. 181-184, 2003.

\* cited by examiner

FIG 12

| Case | Board | Bit Error Rate in % | Signal RMS in mV | SNR in dB | Bit Gain |
|---|---|---|---|---|---|
| Signature $S_1$ | | | | | |
| A | Spartan3 | 0 | 0.376 | 8.5 | 0.126 |
| B | Spartan3 | 9.4 | 0.511 | 4 | 0.112 |
| A | VirtexII | 21.9 | 0.821 | 4 | 0.277 |
| B | VirtexII | 31.2 | 1.047 | 4 | 0.263 |
| Signature $S_2$ | | | | | |
| A | Spartan3 | 0 | 0.374 | 8.5 | 0.147 |
| B | Spartan3 | 3.1 | 0.513 | 4.5 | 0.137 |
| A | VirtexII | 6.2 | 0.859 | 4 | 0.561 |
| B | VirtexII | 0 | 1.063 | 8.5 | 0.632 |
| Signature $S_3$ | | | | | |
| A | Spartan3 | 6.2 | 0.380 | 4 | 0.111 |
| B | Spartan3 | 12.5 | 0.516 | 3 | 0.122 |
| A | VirtexII | na | 0.841 | 3.5 | 0.368 |
| B | VirtexII | 9.4 | 1.073 | 3.5 | 0.381 |

FIG 13

| Case | Board | Bit Error Rate in % | Signal RMS in mV | SNR in dB | Bit Gain |
|---|---|---|---|---|---|
| DES 56 Core | | | | | |
| A | Spartan3 | 0 | 0.384 | 22 | 0.087 |
| B | Spartan3 | 0 | 0.508 | 23 | 0.110 |
| C | Spartan3 | 0 | 1.21 | 22 | 0.109 |
| D | Spartan3 | 0 | 2.15 | 10.5 | 0.0539 |
| A | VirtexII | 0 | 0.794 | 18 | 0.067 |
| B | VirtexII | 0 | 1.022 | 22.5 | 0.191 |
| C | VirtexII | 0 | 2.698 | 12 | 0.067 |
| Arithmetic Coder Core | | | | | |
| A | Spartan3 | 0 | 0.618 | 37 | 0.758 |
| B | Spartan3 | 0 | 0.617 | 38 | 0.720 |
| C | Spartan3 | na | 4.488 | 3 | 0.216 |
| A | VirtexII | 0 | 1.347 | 37.5 | 1.248 |
| B | VirtexII | 0 | 1.343 | 37 | 1.191 |

FIG 14

| | 200 µs | | 100 µs | | 50 µs | |
|---|---|---|---|---|---|---|
| Case | SNR in dB | Bit Gain | SNR in dB | Bit Gain | SNR in dB | Bit Gain |
| A | 22 | 0.087 | 21.5 | 0.091 | 16 | 0.090 |
| B | 23 | 0.110 | 19.5 | 0.110 | 16.5 | 0.111 |
| C | 22 | 0.109 | 18 | 0.107 | 18.5 | 0.107 |
| D | 10.5 | 0.054 | 10 | 0.057 | 9.5 | 0.061 |

WATERMARKING APPARATUS, SOFTWARE ENABLING AN IMPLEMENTATION OF AN ELECTRONIC CIRCUIT COMPRISING A WATERMARK, METHOD FOR DETECTING A WATERMARK AND APPARATUS FOR DETECTING A WATERMARK

CROSS-REFERENCE TO RELATED APPLICATION

This application claims priority from European Patent Application No. 0600526.6, which was filed on Mar. 17, 2006, and is incorporated herein by reference in its entirety.

BACKGROUND OF THE INVENTION

1. Field of the Invention

The present invention relates to the field of watermarking electronic circuits and, in particular, to the watermarking of integrated circuits, like FPGA (field programmable gate arrays) or ASIC (application specific integrated circuits) designed based on IP cores (Intellectual Property cores).

2. Description of Related Art

In the 1970s, only basic functions like discrete logical gates were implemented on integrated circuits. With improvements in the chip manufacturing, the size of the transistors was drastically reduced and the maximum size of a die was increased as well. Now it is possible to integrate one billion transistors on one chip, as described bys Xilinx, Inc., "Next-Generation Virtex Family From Xilinx to top one Billion Transistor Mar", 03131_nextgen.htm, available at: www.xilinx.com/prs_rls/silicon_vir/, in the following referred to as [1]. On the other hand, the market requires shorter product cycles. The only solution is to reuse cores, which have been written for other projects or were purchased from other companies. The number of companies that produce just cores constantly increases. The advantages of reuse of IP cores are enormous. E.g., they offer a modular concept and fast development-cycles.

IP cores are licensed and distributed like software. One problem of the distribution of IP cores is the lack of protection against unlicensed usage. As the cores are provided, e.g., as netlist data, they can be easily copied like software. So there is only a small effort to get the illegal core to function.

To protect their IP cores, some core suppliers encrypt their cores and deliver special development tools, which can handle encrypted cores. The disadvantage is that common tools cannot handle encrypted cores and that the shipped tools can be modified.

Another approach for protection is to hide a signature into the core, a so-called watermark, which can be used as a proof of the original ownership. There exist many concepts and approaches on the issue of implementing a watermark into a core. But most of these concepts are not applicable due to the lack of verification capabilities. A good verification strategy is that the signature (watermark) can be read out only using the bought product. So no extra files or information must be obtained from the accused company.

Hiding a unique signature into user data, such as pictures, video, audio, text, program code, or IP cores is called watermarking. Embedding a watermark into multimedia data is achieved by altering the data slightly at points, where human sense organs have lower perceptions sensitivity. For example, one can remove frequencies, which cannot be perceived by the human ear by coding an audio sequence into an MP3 file. Now, it is possible to hide a signature into these frequencies, without decreasing quality of the coded audio sequence, as described by L. Boney, A. H. Tewfik, and K. N. Hamdy, "Digital watermarks for audio signals," in International Conference on Multimedia Computing and Systems, 1996, pp. 473-480, available at: citeseer.ist.psu.edu/boney96digital.html, in the following referred to as [2].

The watermarking of IP cores is different from multimedia watermarking, because the user data, which represents the circuit, must not be altered, since functional correctness must be preserved. Watermarking procedures can be categorized into two groups of methods: additive methods and constraint-based methods.

Additive methods have in common that the signature is added to the functional core, for example, by using unused lookup tables in a FPGA, as described by J. Lach, W. H. Mangione-Smith, and M. Potkonjak, "Signature hiding techniques for FPGA intellectual property protection," in proceedings of ICCAS, 1998, pp. 186-189, available at: citeseer.ist.psu.edu/lach98signature.html, in the following referred to as [3]. In other words, additive methods add additional logic or elements to those elements, which are required for those operations the integrated circuit of IP core is designed for.

The constraint-based methods were originally introduced by Kahng, Lach, Mangione-Smith, Mantik, Markov, Potkonjak, Tucker, Wang, and Wolfe, "Constraining-based watermarking technique for design IP protection," IBEETCAD: IEEE Transactions on Computer-Aided Design of Integrated Circuits and Systems, vol. 20, 2001, available at: citeseer.ist.psu.edu/kahng01constraintbased.html, in the following referred to as [4], and restrict the solution space of an optimization algorithm by setting additional constraints, which are used to encode the signature.

Some method for constraint-based watermarking in FPGAs include exploiting the wire wrap of a scan-chain [5], preserving nets during logic synthesis [6], placing constraints for CLBs (Configurable Logic Blocks) in odd/even rows [7], or routing constraints with unusual routing resources [7].

A method exploiting the wire wrap of a scan-chain is described by D. Kirovski and M. Potkonjak, "Intellectual property protection using watermarking partial scan chains for sequential logic test generation," in ICCAS, 1998, available at: citeseer.ist.psu.edu/218548.html, in the following referred to as [5]. An example preserving nets during logic synthesis is explained by D. Kirovski, Y.-Y. Hwang, M. Potkonjak, and J. Cong. "Intellectual property protection by watermarking combinational logic synthesis solutions," in proceedings of ICCAS, 1998, pp. 194-198, available at: citeseer.ist.psu.edu/article/kirovski98intellectual.html, in the following referred to as [6]. An example placing constraints for CLB (configurable logic blocks) is explained by A. B. Kahng, S. Mantik, I. L. Markov, M. Potkonjak, P. Tucker, H. Wang, and G. Wolfe, "Robust IP watermarking methodologies for physical design," in Design Automation Conference, 1998, pp. 782-787, available at: citeseer.ist.psu.edu/kahng98robust.html, in the following referred to as [7]. An example based on routing constraints with unusual routing resources can also be found in [7].

The major drawback of these approaches are the limitations of the verification possibilities of the watermarked core. With a good watermarking strategy, the verification can be done only with the given product without additional information from the producer. The bit file of an FPGA can be extracted by wire tamping the communication between the PROM (programmable read-only memory) and the FPGA, for example, when a SRAM (static random access memory)

FPGA loads the bit file from the PROM. But only the approach presented in [3] has the possibility to detect the watermark from these bitfiles.

Some FPGA suppliers provide an option to encrypt the bitstream. The bitfile is stored in the PROM in encrypted form and will be decrypted inside the FPGA. Monitoring the communication between PROM and FPGA in this case is useless, because only the encrypted file will be transmitted. In this case, only the verification over a scan chain is possible [5].

Also the introduced approaches at the HDL (Hardware Description Language) and netlist-levels turn out not to be applicable due to the lack of verification possibilities. The only exception is the scan chain approach, but a scan chain is very unusual in FPGA designs. However, many cores are delivered in HDL or at the netlist level, so a watermarking strategy for these cores would be very useful.

Thus, it can be summarized that the aforementioned approaches for inserting watermarks to FPGAs add overhead, e.g. additional elements not used for the normal operation of the integrated circuit, or limit the optimization of the integrated circuits due to constraints used for watermarking or identification of these integrated circuits. The major disadvantage of the aforementioned approaches are the limited possibilities to detect whether the integrated circuit has a watermark and if the integrated circuit has a watermark, to identify which watermark this particular integrated circuit has. Within this document a watermark is also referred to as or signature or identifier. These approaches, for example, all lack the possibility to detect a watermark by only analyzing the specific integrated circuit, for example, a FPGA or an ASIC or a specific IP core on one of the aforementioned integrated circuits.

SUMMARY OF THE INVENTION

It is an object of the present invention to provide a watermarking apparatus and a software for enabling an implementation of an electronic circuit comprising a watermark, wherein the watermark can be efficiently detected by only analyzing the electronic circuit and to provide a method and an apparatus for detecting said watermark of said electronic circuit.

In accordance with a first aspect, the invention provides a watermarking apparatus for an electronic circuit, having the following features: a watermark memory operative to store a watermark characterizing said electronic circuit; and a watermarking signal generator operative to generate based on said watermark a watermarking signal detectable on a power supply line of said electronic circuit, wherein said watermarking signal is detectable for a recognition of said watermark.

In accordance with a second aspect, the invention provides software enabling a design or implementation of an electronic circuit having a watermark as mentioned above.

In accordance with a third aspect, the invention provides a method for detecting a watermark of an electronic circuit, wherein said watermark characterizes said electronic circuit, having the following step: measuring the signal applied to a power supply line of said electronic circuit; processing said measured signal; and comparing said processed signal with one of a plurality of given watermarks.

In accordance with a fourth aspect, the invention provides an apparatus for detecting a watermark of an electronic circuit, wherein said watermark characterizes said electronic circuit, having: a means for measuring a signal applied to a power supply line of said electronic circuit; a means for processing said measured signal; and a means for comparing said processed signal with one or a plurality of given watermarks.

In accordance with a fifth aspect, the present invention provides a computer program having a program code for performing the above mentioned method.

The present invention is based on the finding that a temporal course and a spectrum of a power signal of an integrated circuit depends on a clock frequency and a design of said integrated circuit. This finding is used to implement a watermark and especially to detect said watermark of said electronic circuit, as will be described in more detail later.

Embodiments of the invention can be applied to a large variety of electronic circuits as the above-mentioned finding is valid for, for example, circuits comprising discrete passive, active or digital devices, for integrated circuits, for application-specific integrated circuits, for specific blocks like, for example, IP cores within larger integrated circuits, and for circuits comprising a mixture of the aforementioned elements.

Preferably, the invention is used for protecting intellectual property rights on IP cores for, for example, FPGA or ASICs. Preferred embodiments of the present invention are implemented such that said watermarking apparatus is part of the functional logic during a normal or operational mode. Thus, the watermarking apparatus is difficult to detect for someone trying to remove the watermarking apparatus and it is also even more difficult to be removed, as the removal can negatively impact the normal operation and functionality of the IP core. Preferably the IP core is provided in a "hidden" manner such that a circuit designer using the IP cores as software modules is not aware of the watermark or at least can use the watermarked IP core like an IP core without a watermark.

In preferred embodiments of the present inventions the watermarking apparatus generates a watermarking signal based on said watermark, wherein the watermarking signal is a voltage signal applied to a power supply line. Thus, the watermarking signal can be measured, for example, at the power supply pins or contacts of said electronic circuit. The watermarking signal can be measured on said electronic circuit without the need of further hardware, like the PROM or further information from a third party. Thus, the verification and proof of the existence of the watermark can be efficiently performed at any time.

Furthermore, no without additional pins or contacts have to be added to the integrated circuit for a later verification, as, for example, existing power supply pins can be used.

The invention is explained based on an embodiment, where FPGA cores are watermarked and where the signature (watermark) is detected at the power supply pins of the FPGA. This is the first watermarking method, where the signature is extracted in this way. One is now able to watermark cores at the netlist as well as the bitfile level, so a wide spectrum of cores can be watermarked. Embodiments of the power watermarking methods work with all types of FPGAs, but with Xilinx FPGAs, the watermarking algorithms and the signature can be integrated into the functionality of the watermarked core. Thus, it is very hard to remove the watermark without destroying the core. A detection algorithm is introduced, which can decode the signature from a voltage trace with high probability. Additionally, a second algorithm based on spreading the watermark is introduced, which improves the detection probability in case of considerable noise sources. Using this latter algorithm, it is possible to decode the signature even if other cores operate on the same device at the same time.

BRIEF DESCRIPTION OF THE DRAWINGS

Preferred embodiments of the present invention are described in detail with respect to the following Figs.

FIG. 5A shows an IP core and a wrapper before a netlist alternation step, FIG. 5B shows said core and said wrapper after said netlist alternation step;

FIG. 12 shows exemplary results of a first, original method;

FIG. 13 shows exemplary results of a second, enhanced method of processing a measured voltage signal with spread watermark bits;

FIG. 14 shows exemplary results for different record times.

DESCRIPTION OF PREFERRED EMBODIMENTS

Figure 1:
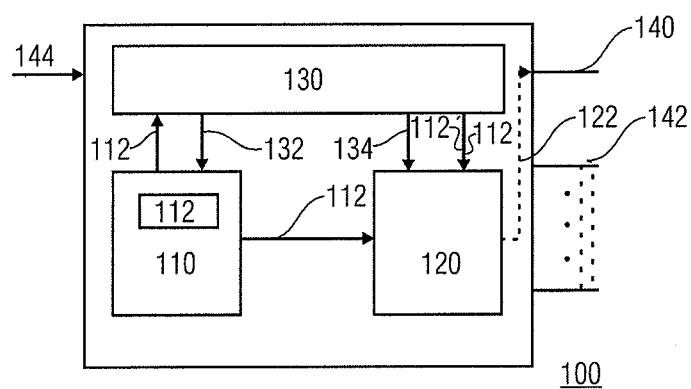
FIG. 1 shows a preferred embodiment of an inventive watermarking apparatus.

FIG. 1 shows a preferred embodiment of an inventive watermarking apparatus 100 for an electronic circuit comprising a watermark memory 110, a watermarking signal generator 120 and a watermarking signal control 130.

Said watermark memory is operative to store a watermark, characterizing said electronic circuit. Said watermarking signal generator 120 is operative to generate based on said watermark 112 stored in said watermark memory 110, the watermarking signal 122 detectable for a detection of said watermark 112 on a power supply line 140 of said electronic circuit 100.

The watermarking signal 122 detectable on said power supply line 140 is shown in broken lines to distinguish it from other signal paths used for transmitting, for example, data to or on data pins 142.

The watermark memory 110 can be operative to output the watermark 112 at once as a binary or any other value or to output the watermark 112 as a sequence of values, for example, a sequence of Bits.

The watermarking signal generator is operative to receive the watermark 112 directly or in a processed manner, wherein a power consumption of said watermarking signal generator 120 depends on a value of said watermark 112 and wherein said watermarking signal 122 depends on said power consumption of said watermarking signal generator 120. In case the watermarking signal generator 120 receives the watermark as a sequence of values, for example, as a sequence of Bits of a predetermined length, a temporal course of said watermarking signal 122 depends on said sequence of values or Bits over time.

For a detection of said watermark 112, a single value can already be sufficient to detect said watermark 112 based on said generated watermarking signal 122, but providing the watermark 112 as a sequence of values is preferable, as the watermarking signal 122 generated thereon shows a specific pattern, which can typically be detected and identified more accurately and more reliably than a watermarking signal 122 based on just one single value.

The watermark can alternatively be also transferred via the watermarking signal control 130 to the watermarking signal generator, as depicted by the signal paths 112.

A preferred embodiment of the inventive apparatus comprises a repeating unit, operative to control an application of the watermark for the generation of the watermarking signal through the watermarking signal generator such that each bit of said sequence of bits is repeatedly applied a predefined number of times, i.e. is spread, before a next bit of said sequence of bits is applied.

Referring to FIG. 1, said repeating unit can be implemented in different ways, for example, can be connected between the watermark memory 110 and the watermarking signal generator 120, for example implemented as a buffer, or, for example, can be part of the watermarking signal control 130. In such an embodiment, the watermarking signal control 130 can be operative to receive the watermark 112 and to repeat or hold each bit of the watermark 112 for said predefined number of times and apply such spread watermark 112' to the watermarking signal generator 120.

In a preferred embodiment, as shown in FIG. 1, said electronic circuit is operative to change, for example, between a normal operational mode and a watermarking signal generation mode, which in the following will also be referred to as reset mode, wherein the change between both modes is based on a given event. The event can be an external signal, for example, the reset signal 144 or an internal event, like an internal scheduler or an internal status, or a combination of external and/or internal signals and/or events. The electronic circuit, for example, can be operative to change first into a watermarking signal generation mode when the power supply is activated and will only change to an operational mode after completing said watermarking signal generation mode, for example, for a predetermined duration. Thus, sufficient access and time is assured for a watermark detection.

The watermarking signal control 130 can then be implemented to initiate said generation of said watermarking signal 122 by said watermarking signal generator 120 when said electronic circuit is, or changes, into said watermarking signal generation mode. Upon such given event, the watermarking signal control 130 can output a signal 132 to initiate the output of the watermark 112 by the watermark memory 110 and initiate by signal 134 said generation of said watermarking signal 122 by said watermarking signal generator 120 based on said watermark.

Said electronic circuit and/or said watermarking apparatus 100 can be operative to change back to operational mode based on another event, for example, an external termination signal to terminate the watermarking signal generation mode or an internal event, for example, after having output the watermark 112 and generated the watermarking signal 122 for a predefined number of times.

A further embodiment is arranged such that said watermark memory or said watermark signal generator is part of a functional logic of said electronic circuit when said electronic is in another mode than the watermarking signal generation mode.

An inventive watermarking apparatus can also be implemented such that same does not contain a watermarking signal control. In such a case, the watermarking apparatus 100 could be implemented, for example, to continuously generate a watermarking signal.

In this case, the inventive watermarking apparatus can be operative to generate the watermarking signal during normal operation or in an operational mode. On the other hand, the detection of the watermarking signal or the watermark could be more difficult due to interferences cased by other active, i.e. operating elements of said electronic circuit during normal operation. Nevertheless, this can be compensated by respective signal processing of a measured watermarking signal.

Therefore, embodiments of the present invention comprise versions, wherein only the watermarking apparatus is operative to change into a watermarking signal generation mode, or versions, wherein the watermarking apparatus has only one mode and does not switch between a watermarking signal generation mode and, for example, an inactive or idle mode.

Preferred embodiments of the present invention are arranged such that the complete electronic circuit is operative to change into a watermarking signal generation mode to reduce said interference.

In the following, the term watermark will also be referred to as signature, the term IP core will also be referred to as core, and the term watermarking signal generator will also be referred to as power pattern generator.

The core supply voltage, for example, can be sampled with a usual scope and analyzed and decoded with an algorithm developed to run on a PC (personal computer). The decoded signature can be compared with the original signature and so, the watermark can be verified. This method is not destructive and can be done using the given product only.

The problem of watermarking FPGAs is not the coding and insertion of a watermark, rather than the verification with an FPGA embedded in a system. So the description of the invention will also discuss the verification of watermarks, too. There are four sources to get information of a design from: 1) Bit file, 2) ports, 3) power and 4) electromagnetic (EM) radiation.

An embodiment of the present invention provides a solution to extract the core signature from the FPGAs power consumption pattern. This idea defers from the documents of P. Kocher, J. Jaffe, and B. Jun, "Differential power analysis," Lecture Notes in Computer Science, vol. 1666, pp. 388-397, 1999, available at: citeseer.ist.psu.edu/kocher99differential.html, in the following referred to as [8] and D. Agrawal, B. Archambeault, J. R. Rao, and P. Rohatgi, "The em side-channel(s)," in CHES '02: Revised Papers from the 4$^{th}$ International Workshop on Cryptographic Hardware and Embedded Systems. London, UK: Springer-Verlag, 2003, pp. 29-45, in the following referred to as [9], where the goal of using power analysis techniques is not watermarking or intellectual property protection, but the detection of cryptographic keys and their security issues.

There is no way to measure the power consumption of a FPGA directly, but only, for example, through measuring the voltage or the current. In the embodiment of the present invention described in the following, the voltage of the core is measured close to the voltage supply pins, so the smoothing from the plane and block capacities are minimal and no shunt is required. Most FPGAs have ball-grid array (BGA) packages and the majority of them have vias to the back of the printed circuit board (PCB) for the supply voltage pins. So it is easy to measure the voltage or the scope on the rear side of the printed circuit board.

The following description comprises a discussion of an apparatus for detecting a watermark based on measuring the voltage at the voltage supply of the FPGA IP core, the discussion of the analysis of the core voltage, the discussion of the implementation of said embodiment and the embedding of said watermark. Furthermore, the signal processing for the measured voltage and the detection algorithms are described and experimental results are presented.

Figure 2:
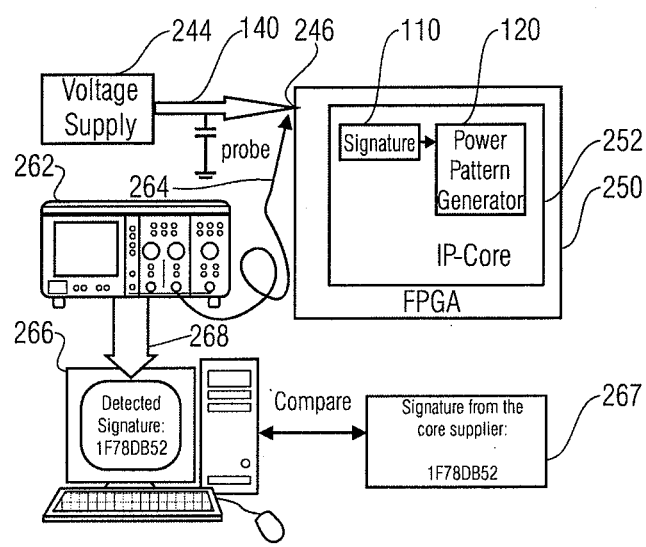
FIG. 2 shows an embodiment of an apparatus for detecting a watermark of an electronic circuit based on a voltage measurement.

FIG. 2 shows said embodiment for an apparatus for detecting a watermark in a FPGA 250. FIG. 2 shows a voltage supply 244 supplying power to the FPGA 250 via a power supply line 140, a scope 262, a probe 264, a personal computer 266, wherein the probe 264 is connected to the scope 262 and is arranged to measure the voltage at the voltage supply pins 246 of the FPGA 250, and wherein the scope 262 is operative to provide a signal trace 268, also referred to as temporal course of said signal, to the personal computer 266. The personal computer 266 further comprises a database 267 of one or a plurality of signatures from a specific core supplier. The FPGA 250 comprises an IP core 252, wherein the IP core 252 further comprises a watermark memory 110 for storing the watermark and a watermarking signal generator 120, in FIG. 2 referred to as power pattern generator.

The embodiment of the method for detecting said watermark of the FPGA as shown in FIG. 2 can also be referred to as "watermark verification using power signature analysis". For the detection, a power pattern or voltage pattern is generated inside the core from said signature (watermark), such that said pattern can be probed with said probe 264 at the voltage supply pins 246 of the FPGA 250. From the trace 268 provided by the scope 262 based on the probe, i.e. based on said measured voltage pattern, the personal computer 266 verifies the existence of the watermark based on a detection algorithm executed by the personal computer 266.

The consumed power of an FPGA can be divided into two areas, the static and the dynamic power. The static power consumption is founded in the leakage current from CMOS transistors and does not change over time if the temperature is not changed. The dynamic power consists of the power of the short circuit current and the power of reloading the capacities the transistors and the wires. The short circuit current occurs, if both transistors, the PMOS (p-channel Metal-Oxide-Semiconductor) and the NMOS (n-channel Metal-Oxide-Semiconductor), are conducting for a short time during the switching activity. Both parts of the dynamic power consumption depend on the switching frequency, as described by A. Chandrakasan, S. Sheng, and R. Brodersen, "Low-Power CMOS Digital Design," 1992, available at: citeseer.ist.psu.edu/chandrakasan95low.html, in the following referred to as [10]. As shown by L. Shang, A. S. Kaviani, and K. Bathala, "Dynamic power consumption in Virtex-II FPGS family," in FPGA '02: Proceedings of the 2002 ACM/SIGDA tenth international symposium on Field-programmable gate arrays. New York, N.Y., USA: ACM Press, 2002, pp. 157-164, in the following referred to as [11], the main part of the FPGA's dynamic power results from capacity reloading.

So, what happens to the core voltage, if many switching activities occur at the same time, like a rising edge of a clock signal? First, one can discover a breakdown of the core voltage, and then an overshoot, as shown in FIG. 3.

Figure 3A:
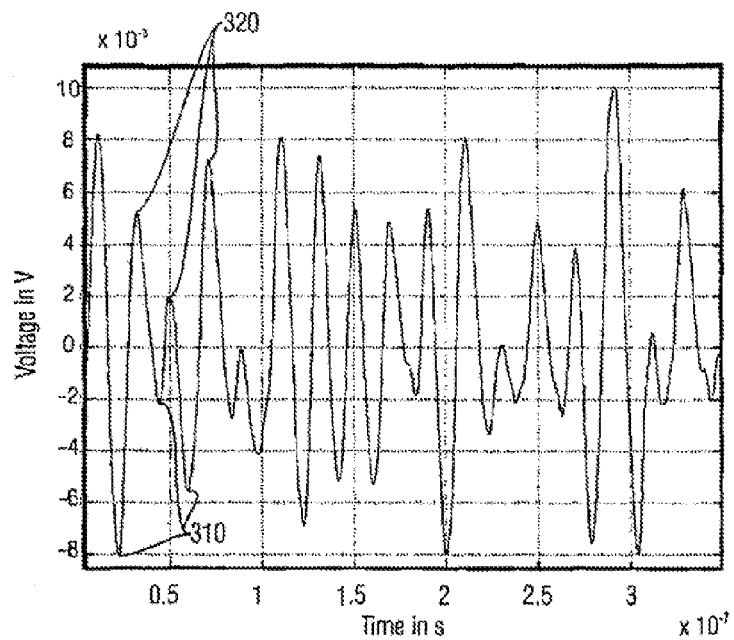
FIG. 3A shows a measured voltage signal from a voltage supply pin of a FPGA, wherein voltage breakdowns and overshoots can be seen.

FIG. 3A shows an exemplary measured voltage signal from a voltage supply pin of a FPGA. The x-axis plots the time in $10^{-7}$ s and the y-axis plots the voltage in mV. Voltage breakdowns 310 and overshoots 320 can be seen.

The real behavior of the core voltage depends on the individual FPGA, the individual printed circuit board and the individual voltage supply circuits.

Figure 3B:
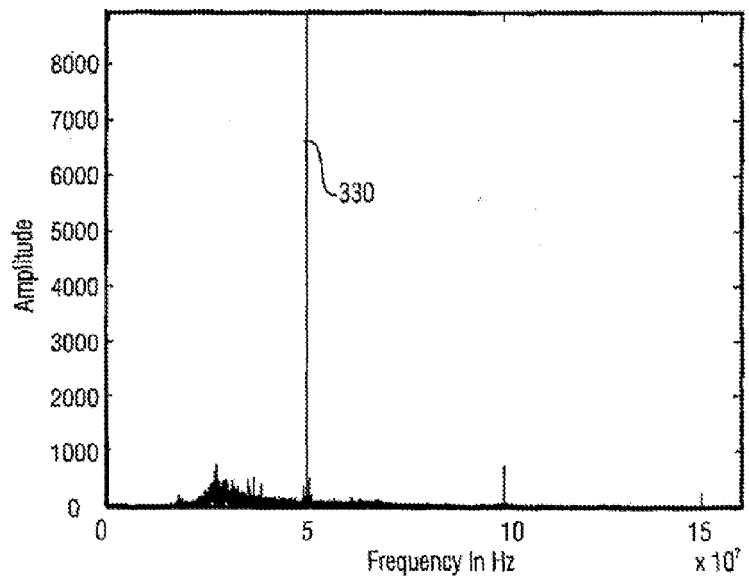
FIG. 3B shows a spectrum of said measured signal of FIG. 3A showing the clock frequency of 50 MHz and its harmonics.

FIG. 3B shows the spectrum of the measured voltage signal from FIG. 3A, wherein the x-axis plots the frequency in $10^7$ Hz and the y-axis plots the amplitude of the spectrum. The clock frequency 330 of 50 MHz and harmonics thereof can be seen. Also, a peak at a half of the clock frequency is visible, which is caused by switching activities from the logic.

Now, two methods to encode a watermark into the core voltage characteristics are described. First, varying the frequency and second, changing the amplitude.

In the first case, a watermark can be identified if one produces another frequency line in the spectrum of the core voltage, which is not an integer multiple or a rational fraction of the clock frequency. For achieving this, one needs a circuit that consumes a considerable amount of power and thus generates a signature-specific power pattern, and a clock, which can be identified in the spectrum. The power consumer can be, for example, an additional shift register. If one derived the clock source directly from the operational clock, one cannot definitely distinguish the watermark frequency line in the spectrum from the frequency line of the operational logic.

Therefore, another possibility is to generate a clock using a combinatorial logic. This can be identified as a watermark, but the jitter of a combinatorial clock source can be very high, depending on the logic and the circuit, and, thus, in these cases no clean frequency line can be seen in the spectrum. Thus means that one needs a higher additional power consumption to make the watermark readable. Another drawback is that the possibilities to encode a reliable signature in these frequency lines are limited. In a preferred embodiment, therefore, the amplitude of the interferences in the core voltage is altered.

The basic idea is to add a power pattern generator (e.g., shift registers), and clock them with the operational clock or an integer division. Further, one controls this power pattern generator according to the characteristic watermark. A logical '1' lets the power consumer operate one cycle, e.g. perform a shift, a zero '0' leads to no operation, e.g. perform no shift. In the voltage profile over time, one detects higher amplitudes corresponding to the ones and smaller amplitudes, according to the zeros. Note that the amplitude for the no operation state is not zero, because the operational logic and the clock tree are still active.

The advantage of power watermarking methods is that the signature can easily be read out from a given device. Only the core voltage of the FPGA must be measured and recorded. No bitfile is required, which needs to be reverse-engineered. Also, embodiments of the inventive methods work with encrypted bitfiles, whereas methods where the signature is extracted from the bitfile fail. Moreover, one is able to sign netlist cores, because the watermarking algorithm does not need any placement information. So, also cores at this level can be protected.

The described embodiment of the power watermarking method uses two shift registers, a big shift register for causing a recognizable signature-depending power consumption pattern, and a shift register for storing the signature itself. The big shift register for causing a recognizable signature-depending power consumption pattern corresponds to the watermarking signal generator 120, as shown in FIG. 1, and the shift register for storing the signature corresponds to the watermark memory 110, as shown in FIG. 1.

The signature shift register is clocked by the operational clock and the output bit enables the power pattern generator. If the output bit is a '1', the power pattern register will be shifted at the next rising edge of the operational clock. At a '0', no shift is done. To avoid interferences from the operational logic in the measured voltage, the signature is only generated during the reset phase of the core. The reset or reset mode corresponds to the aforementioned watermarking signal generation mode In some FPGA architectures (e.g., Xilinx Virtex), the lockup tables (LUTs) can also be used as a shift register, as described by Xilinx, Inc. Virtex-ii platform fpgas: Complete data sheet, ds031.pdf., available at: direct.Xilinx.com/bv-docs/publications, in the following referred to as [12]. A four input lookup table can also be used as a 16 Bit shift register, as shown in FIG. 4.

Figure 4:
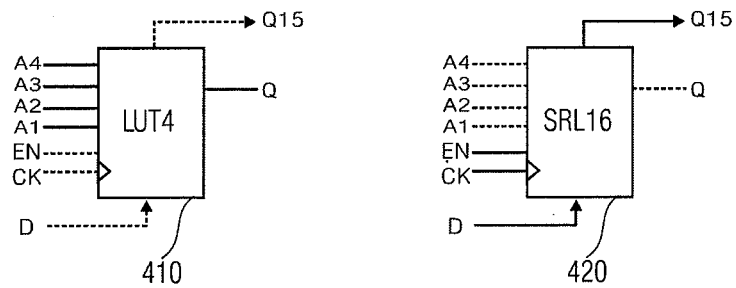
FIG. 4 shows an exemplary Xilinx Virtex architecture, depicting on the left-hand side, a four input lookup table (LUT4), which can also be configured as a 16 Bit shift register (SRL16), which is shown on the righthand side of FIG. 4.

FIG. 4 shows, on the left-hand side thereof, a four input lookup table (LUT4) 410, used as a lookup table, wherein the content can be addressed via the input ports (address signals) A1 to A4 and is output at output Q. In this mode, the enabling signal EN, the clock signal CK, the data input signal D and the output signal Q15 are not used.

FIG. 4 shows, on the right-hand side thereof, a lookup table 410 used as a shift register 420 (SRL16), wherein now the address inputs A1 to A4 and the data output Q are inactive and wherein the shift register 420 is now clocked by clock signal CK, enabled by enabling signal EN to read data input signal D and to output data at Q15.

This allows to use functional logic 410 for implementing the power pattern generator 120 according to FIG. 1 in the form of, for example, a shift register 420, as shown in FIG. 4.

The core can be arranged to operate in two modes, the functional mode and the reset mode, wherein the functional mode corresponds to the normal or operational mode, as discussed before and the reset mode corresponds to the watermark generation mode, as described before.

In the functional mode, the shift is disabled and the shift register operates as a normal lookup table. In the reset mode, the content is shifted according to the signature bits and consumes power, which can be measured outside of the FPGA. To prevent the loss of the content of the lookup table, the output of the shift register is fed back to the input, so the content is shifted circularly. When the core changes to the functional mode, the content must be shifted to the proper position to have a functional lookup table for the core.

Also, it is possible to initialize the content of the power consumption shift register shifted, which are also part of the functional logic. Only during the reset state, when the signature is generated, the functional logic can be initialized correctly. So, normal core operation cannot start before the signature was generated. The advantage is that the core is unable to operate at the beginning and only starts operating after the signature was generated. Also, to avoid a too short reset time in which the watermark cannot be exactly detected, the right functionality will only be established if the reset state is equal to or longer than a predefined time. This prevents that the user can leave out or shorten the reset state to avoid that the signature cannot be properly detected.

The signature itself can be implemented as part of the functional logic in the same way. Some lookup tables are connected together and the content, the function of the LUTs, represents the signature. This embodiment makes it almost impossible for an attacker to change the content of the signature shift register.

The advantage of using the functional logic of the core also as a shift register is the reduced resource overhead for the watermarking and the robustness of this method, because these shift registers are embedded in the functional design, and it is hard, if not impossible, to remove shift registers without destroying the functional core. Also, said watermarking procedure is difficult to be detected in a netlist file, because the main part of the required logic for signature creation depends on the functional logic for the proper core. Another benefit is that said watermark cannot be removed by an optimization step during the mapping into CLBs (Configurable Logic Blocks).

In the following, the procedure of watermarking a core, for example, by a company providing such IP cores, is described. The embodiment of the watermarking procedure described hereafter is easy to use and consists of only two steps. First, the core must be embedded in a wrapper, which contains the control logic for emitting the signature. This step is done at the HDL-level and before synthesis.

Figure 5A:
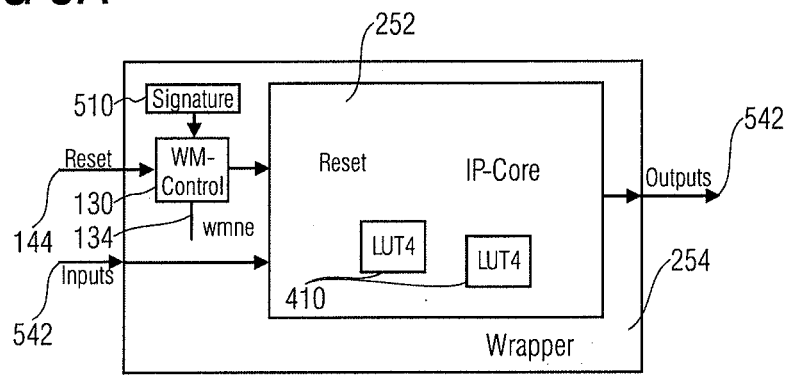
FIGS. 5A to 5B show an embodiment of the present invention during the design phase.

FIG. 5A shows an IP core 252 and a wrapper 254 after synthesis of the wrapper and before a netlist alternation step, wherein the functionality of an IP core described in said hardware description language is alternated to a representation as netlist. The IP core 252 as shown in FIG. 5A represents the IP core without a watermark (original IP core), i.e. the functional design. The same is true for the input and output ports for the input and output signals 542. The reset signal 144 may also be already defined through the original IP core or can optionally be added to the design to introduce a reset mode.

For implementing the watermark, the wrapper 254 is wrapped around the "functional" IP core and depending on the implementation, comprises a part or the complete logic for implementing the watermark. The wrapper 254 as shown in FIG. 5A comprises the watermark control (WM-Control) 130, which corresponds to the watermarking signal control 130 of FIG. 1. Furthermore, the wrapper 254 as shown in FIG. 5A comprises a watermark memory 510, for example, in the form of a shift register containing the watermark (Signature). The IP core 252 comprises two exemplary 4 input lookup tables 410 (LUT4), as shown in FIG. 5A, which are suitable to be used as power generation shift registers in a reset mode.

The second step is at the netlist level after synthesis. A program converts said suitable 4 input lookup tables 410 (LUT4) into shift registers 520 to create the power pattern generator shift registers and attaches the corresponding control signal from the control logic in the wrapper, as shown in FIG. 5B.

Figure 5B:
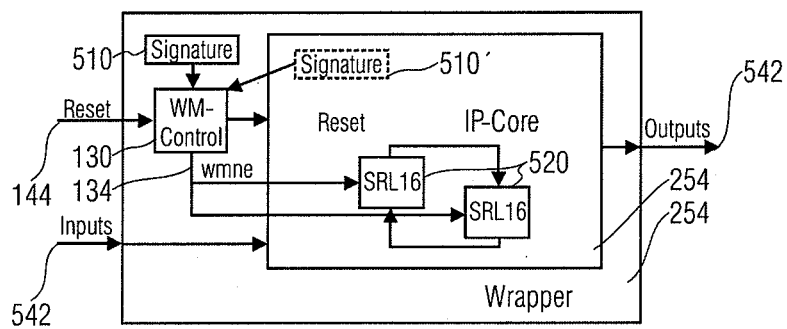

FIG. 5B shows the IP core 252 and the wrapper 254 of FIG. 5A after the netlist alternation step. The IP core 252 now comprises two exemplary 16 Bit shift registers (SRL16) due to the conversion of the two exemplary lookup tables 410 of FIG. 5A.

In FIGS. 5A and 5B, the signal "wmne" is an enable signal for shifting the power pattern generator shift register and corresponds to the control signal 134 according to FIG. 1, the "reset" corresponds to the external event signal 144 according to FIG. 1 and the "inputs" and "outputs" 542 correspond to the signals over the data pins 142, as shown in FIG. 1.

As discussed above, the wrapper contains the control logic 130 for emitting the watermark and can be operative to contain the signature shift register 510, holding the signature or watermark. If functional lookup tables are used as signature shift register 510' one adds or converts this shift register in the second step, similar to the power pattern generator shift registers 520, in the second step and so the wrapper contains only the control logic 130.

Thus, the number of additional logics for implementing the watermark is reduced to a minimum. Some control signals, as shown in FIG. 5A, i.e. in step 1, like the wmne-signal 134, do not have any sink yet, because the sink will be added in the second step, as shown in FIG. 5B after synthesis, wherein the wmne-signal 134 is now connected to the converted shift registers 520. The same is valid for an embodiment of a watermarking apparatus if a converted functional logic 510' is also used for the signature. So, one must use synthesis constraints to prevent the synthesis tool from optimizing these signals away. The ports of the wrapper are the same for the core, so one can easily integrate said wrapper into the hierarchy.

The control logic 130 shifts the signature-shift register 510, 510', while the core 252 is in the reset state. Also, the port and shift register 520 is shifted, corresponding to the output of the signature-shift register 510, 510'. In the embodiment as shown in FIG. 5B, the watermark control 130 receives the watermark from the signature-shift register 510, 510' and transfers it to the port and generator shift registers 520. Alternatively, the watermarking apparatus can be operative such that the signature-shift register 510, 510' transmits the watermark directly or via other elements to the shift registers 520.

Referring back to FIG. 4, the two shift registers 520, as shown in FIG. 5B can be connected through the data input D and the data output Q15, as shown in FIG. 4, on the right-hand side thereof, the wmne-signal 130 can be connected to the enabling pin EN of a shift register 420, as shown in FIG. 4. The clock CK of FIG. 4 is not shown in FIGS. 5A and 5B.

Although FIGS. 5A and 5B show an embodiment of an inventive watermarking apparatus, wherein the power consumption shift registers are part of the functional logic of the IP core 252, the invention is not limited to such embodiments. In alternative embodiments, the watermarking signal generator 120 or the power consumption shift register 520 can also be implemented within the wrapper 254, thus increasing the overhead for the implementation of the watermarking, but at the same time increasing the flexibility to implement said inventive watermarking apparatus, even if the number of suitable functional logic lookup tables is not sufficiently high.

Although FIGS. 5A and 5B show an embodiment of an inventive IP core and watermarking apparatus comprising two circular-connected 16 Bit shift registers, the invention is neither limited to 16 Bit shift registers, nor to a circular connection of two shift registers of the same kind. Alternatively, any number and any type of shift registers may be combined to generate weaker or stronger watermarking signals (power generating shift registers 520) or a longer or shorter watermark (signature-shift register 510, 510') can be used.

Furthermore, the invention is not limited to the usage of shift registers for the watermark memory or the watermarking signal generator. The former, for example, can also be implemented as RAM or ROM and the latter can also be implemented, for example, as a sequence of individual flip-flops or higher level functional elements, like multipliers, generic DSP blocks (digital signal processing), etc.

Thus, for example, an alternative embodiment of the watermarking apparatus can comprise a ROM (read-only memory) as a watermark memory and an embedded signal processor or arithmetic logic unit (ALU) as the watermarking signal generator. A key characteristic for an embodiment of the invention is that the watermarking signal generator generates the watermarking signal based on said watermark, such that it is detectable on said power supply line and that it can be distinguished from other watermarking signals, which are again generated based on other watermarks.

If the reset input of the wrapper gets inactive, the function of the core cannot start at the same cycle, because the position of the contents in the shift register are not in the correct state. The control logic 130 shifts the register content of the shift registers 520 into the correct position and leaves the reset state to start the normal operation mode, wherein the shift register 520 and 510' are again used, for example, as lookup tables 410, as shown in FIG. 5A.

The translations of four input lookup tables (LUT4) 410 of the functional logic into 16 Bit shift registers 520 (SRL16) are done at the netlist level. The usage of the lookup table 410 (LUT4) as a shift register 520 (SRL16), as shown in FIGS. 5A and 5B is only possible if the lookup table 410 is not part of a multiplexer logic. This is not possible, because the additional shift logic and the multiplexer share common resources in a slice. Also, if the lookup table 410 is part of an adder, the mapping tool splits the lookup table and the carry chain. In these two cases, additional slices would be required, so preferably these lookup tables are not converted into shift registers 520. In other words, they are less suitable for a conversion.

The above conversion can, for example, be done by a program, which reads an EDIF-netlist (electronic design interchange format) and also writes a modified EDIF-netlist. First, the program reads all lookup instances 410, for example, LUT4, checks if the following logic is not a "MUXF5" or a "MUXCY" or a "XORCY". Then, the remaining instances are converted to a shift register 520 (SRL16), if required, initialized with the shifted value and connected to the clock and the watermark enable (wmne) signal to these shift registers. Two shift registers can be connected together to rotate their contents. Finally, the modified netlist is written.

The present invention also provides a software enabling a design or implementation of an electronic circuit comprising a watermark according to one of the aforementioned embodiments. Embodiments of the watermarking apparatus, wherein said electronic circuit has been implemented using a software and preferably using an intellectual property core (IP core), have been described.

Figure 6:
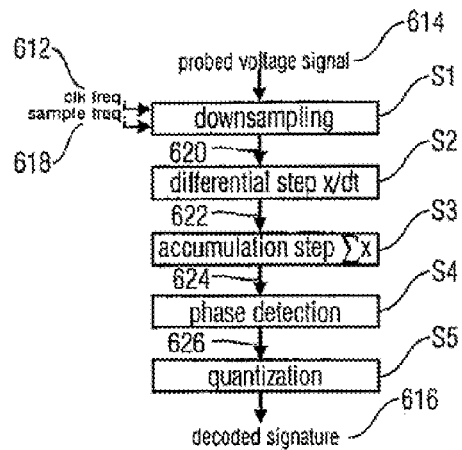
FIG. 6 shows a flow chart of an embodiment of the processing of a measured voltage signal for decoding a watermark.

In the following, an embodiment of the method for detecting a watermark will be explained. The measured voltage will be probed, digitized and decoded by a signature detection algorithm, as shown, for example, in FIG. 6. To decode the digitalized voltage signal, the sampling rate, the clock frequency of the shifted signature and the bit length of the signature is needed. The clock frequency 612 can be extracted from, for example, a Fast Fourier Transformation of the measured signal 614. The detection algorithm, as shown in FIG. 6, consists of five steps: downsampling (step S1), differential step (step S2), accumulation (step S3), phase detection (step S4) and quantization (step S5). After the quantization step S5, the decoded signature 616 can be simply compared bit wise with the signature from the core supplier, i.e. can be compared bit by bit. As mentioned before, the main characteristic caused by a switching event is the breakdown of the voltage followed by a subsequent overshoot. This results in extreme slopes. The detection algorithm, as shown in FIG. 6, can find each rising edge, as will be described in the following.

First, the measured signal 614 will be downsampled from the recorded sample rate to the quadruple 618 of the clock frequency, so each signature bit is represented by four samples (first step S1).

Figure 7A:
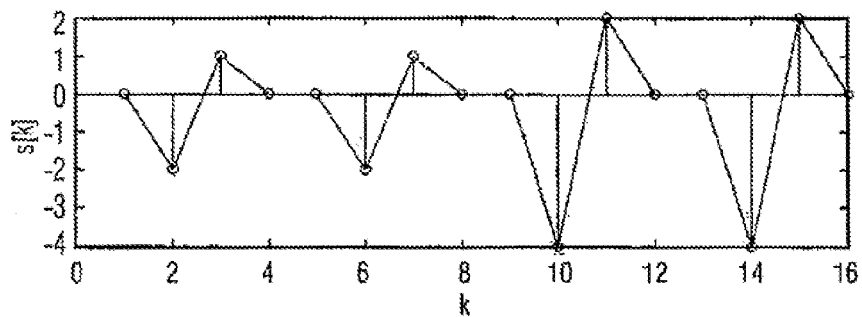
FIG. 7A shows an exemplary voltage signal representing a watermark "0011"

FIG. 7A shows an exemplary voltage signal, which plots an exemplary watermarking signal generated based on a signature "0011", i.e. a sequence of bits. The x-axis plots the sample or signal index k and wherein the y-axis represents the sample signal s[k] 620, i.e. the amplitudes of the sampled signal. The samples shown in FIG. 7A plot idealized samples for an easier understanding of the signal-processing and detection method.

Figure 7B:
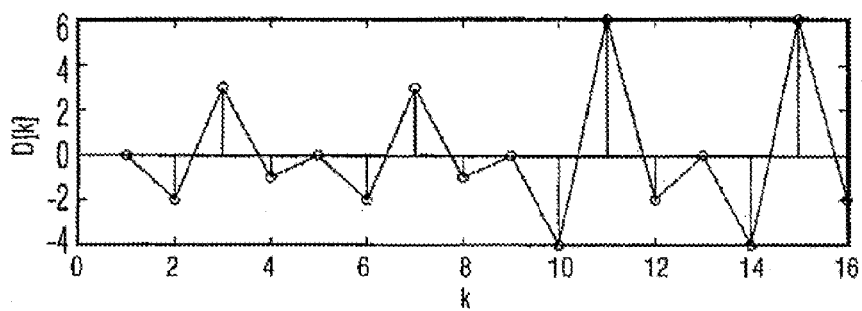
FIG. 7B shows an embodiment of a differential signal after differentiation of said voltage signal according to FIG. 7A.

Then, the discrete derivative D[k] 622 of the sample signal s[k] will be calculated. In the following the discrete derivative D[k] will also be referred to as differential signal D[k]. This transforms the rising edges of the switching events into peaks, as can be seen in FIG. 7B, wherein the values of D[11] and D[15], which represent the difference between the breakdown and the overshoot, are much higher than the other differential signals. FIG. 7B shows the differential signal D[k], wherein the x-axis again plots the sample index k and wherein the y-axis plots now the differential signal D[k] of the signal s[k] of FIG. 7A.

The easiest way to calculate the discrete derivative is to take the difference of a time:

$$D[k]=s[k]-s[k-1] \tag{1}$$

wherein, as mentioned before, s[k] is the sampled probe voltage signal and D the discrete derivative and k denotes the sample index.

Since the signature can be repeated many times during a reset state, the signal can be accumulated and averaged to reduce the noise level. In the embodiment of the detection algorithm shown in FIG. 6, the discrete derivative D[k] is accumulated and averaged (step S3) to produce a signal S[k] 624, which in the following is also referred to as accumulated signal S[k]. To accumulate the coherent pattern, one needs to know the bit length of the signature. If one records along a signal sequence, one can accumulate more patterns and, thus, reduce noise and also switching events, which do not belong to the power consumption register of the watermarking algorithm, for example, from other cores on the chip. The disadvantage is that a longer time for the reset is needed.

After the third step S3, one has an accumulated signal S[k] where each signature bit is represented by four samples, but only one sample has the information of the rising edge. Since the measurement in this embodiment is not synchronized with the FPGA clock, the phase or position of the relevant sample within these four samples of a Bit is unknown. Therefore, the signal is divided into four new signals, where one signature Bit is represented by one sample. The four signals have a phase shift of 90° to each other. Let $$S[k], k=0, 1, \ldots, 4n-1 \tag{2}$$

denote the sampled voltage signal after the accumulation step. Then, one obtains the four following phase shifted signals $$S_0=S[4k], k=0, 1, \ldots, n-1 \tag{3}$$

$$S_{90}=S[4k+1], " \tag{4}$$

$$S_{180}=S[4k+2], " \tag{5}$$

$$S_{270}=S[4k+3], " \tag{6}$$

wherein S is the accumulated signal, wherein n denotes the length of the signature and wherein $S_0$, $S_{90}$, $S_{180}$ and $S_{270}$ are the phase shifted signals derived from S, each representing a subset of S according to a specific phase shift.

Figure 8A:
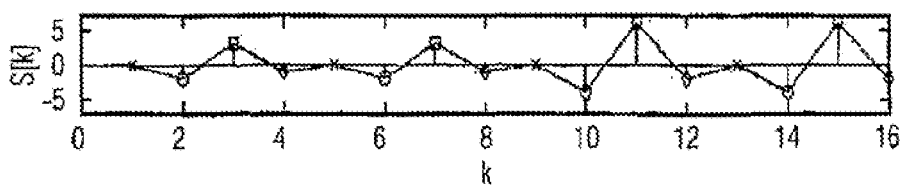
FIG. 8A shows an exemplary accumulated signal based on the differential signal according to FIG. 7B.
Figure 8B:
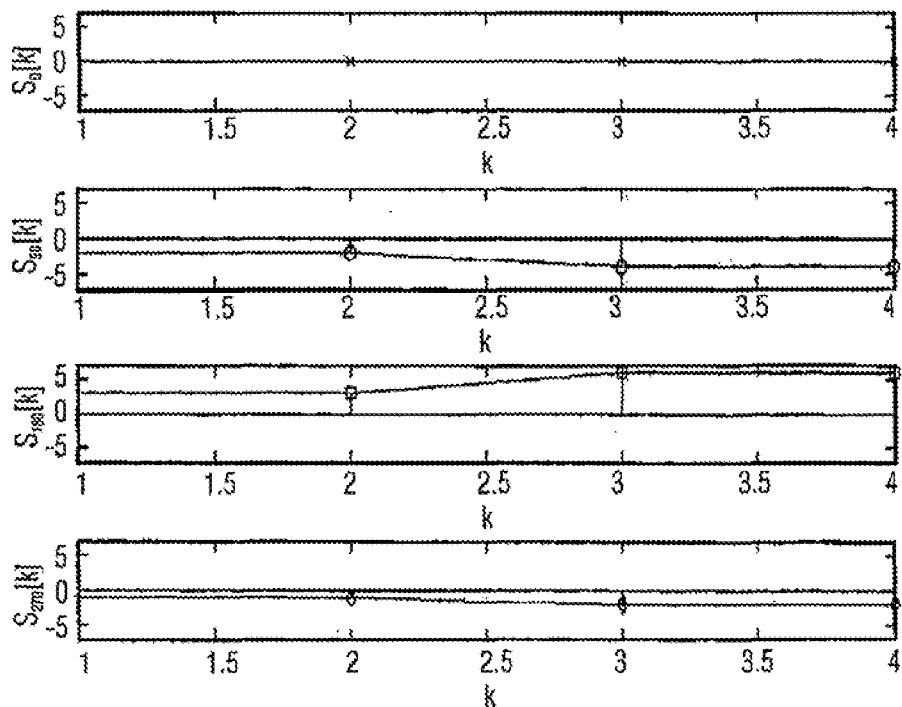
FIG. 8B shows four phase shifted signal sequences $S_0$, $S_{90}$, $S_{180}$ and $S_{270}$ after dividing said average differential signal of FIG. 8A into said four phase shifted signals.

FIG. 8A shows an exemplary accumulated signal S[k] and FIGS. 8B shows said four phase-shifted signals according to the accumulated signal of FIG. 8A, wherein the upper diagram of FIG. 8B shows the phase shifted signal $S_0[k]$, the second diagram shows the phase shifted signal $S_{90}[k]$, the third diagram shows the phase shifted signal $S_{180}[k]$ and wherein the lower diagram of FIG. 8B shows the phase shifted signal $S_{270}[k]$.

One is able to win the phasing of the signal, or in other words to win the phase shifted signal associated to the rising edge, if one calculates the mean value of each phase-shifted signal. The phase-shifted signal with the maximal mean value corresponds to the correct phasing and is selected for the further processing, because the switching event should cause the greatest rising edge in this signal. In FIG. 8B, the phase-shifted signal $S_{180}$ has the maximum mean value and, thus, corresponds to the right phasing. Thus, as a result of the fourth step S4, the phase-shifted signal $S_{180}$ 626 is chosen for the quantization. The selected phase shifted signal 626, here $S_{180}$, will also be referred to as the phase signal.

Now, one has a phase signal 626 in which each sample is represented by the accumulated switching activities of one bit of the signature. The quantization (step S5), i.e. the decision if the sample corresponds to a signature bit "1" or "0" can be done by comparing the sample or phase signal values of the phase signal 626 with the mean value of the phase signal 626. If the sample value is higher than the mean value, the algorithm decides for a "1", in the other case for a "0". The quantized signal 616 is also referred to as decoded signal or decoded signature.

Thus, an efficient method for processing the measured signal 614 is provided.

Figure 9:
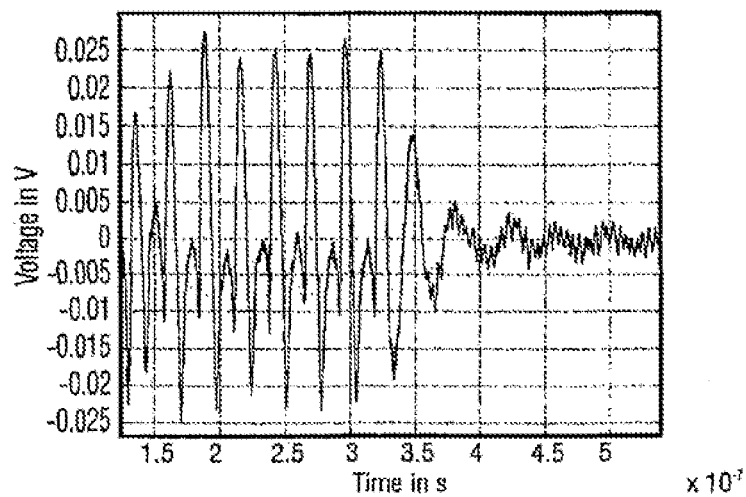
FIG. 9 shows an exemplary measured voltage supply signal corresponding to a transition from "F" to "0" of a watermark "FFFF0000"

Experimental results, which will be discussed in more detail later, have shown that the decoding of the signature works well, but on some targets, problems occur in the decoding of signatures with long runs of "1" followed by many zeros, like "1111111100000000". For the first 8 bits, one can see a high amplitude and then a phase in where the amplitude is faded out, as shown in FIG. 9. The phase can be many clock cycles long and could lead to a wrong detection of the following bits after the change from "1" to "0" values.

FIG. 9 shows the transition of an exemplary measured voltage supply signal when generating a watermarking signal based on the watermark "FFFF0000" with a large power pattern generator shift register. This fading out of the amplitude can, for example, be produced by a resonance circuit, which consists of the capacities and resistance from the power supply plane and its blocking capacities. This behavior is dependent on the printed circuit board and the power supply circuit.

To avoid such a false detection, in a preferred embodiment, the signature bits are spread up, so the time for sending one bit is higher than the swing out or phase out from the printed circuit board. The bits are spread up by repeating one bit m times, where m is preferably the number of steps one cycle of the power consumption shift register needs. If one connects two 16 bit shift registers SRL16 together, one cycle for the shift register needs m=32 steps. The advantage is that if the reset phase ends and the sending of one bit is finished, the content in the shift register, which also represents a part of the logic of the core, is in the correct position.

The detection algorithm differs for this method. First, the signal will be downsampled and the approximate derivation will be calculated like in the original method described before, see steps S1 and S2.

Now, the average of the signal is calculated to suppress the noise (step S3). But here, the length of one signature word is the length of the signature (n) multiplied by the number of times each bit is sent (m). As defined before, this is the square of the length of the signature.

$$D[k], k = 0, 1, \ldots, K - 1 \tag{7}$$

$$N = \left\lfloor \frac{K}{4m \cdot m} \right\rfloor, \tag{8}$$

$$S = \frac{1}{N} \sum_{r=0}^{N-1} D[4m \cdot n \cdot r, \ldots, 4m \cdot n \cdot r + 4m \cdot n - 1], \tag{9}$$

where each spread signature bit is again represented by four signal values, i.e. after differentiation in step S2 by four differential signals D[k], where D is the voltage signal after the differential step with k, where k is the sample index, where K is a recording length defined as the total number of measured or probed signal values or number of differential values of D[k], wherein K is not necessarily an integer multiple of 4m·n, representing one spread signature, and wherein N is the integer number of complete repetitions of the pattern or spread signature. S is the accumulated signal, i.e. the accumulated average over the N repetitions of the pattern and r the corresponding index.

The phase detection, step S4, to select the phase signal is the same as in the method described before, which is also referred to as "original method". But now due to the spreading also a position or offset p is needed, where a new signature bit starts. This is done in a loop to detect this position p. In the beginning, it is assumed that the starting position is the beginning of the trace (p=0), or in other words is the beginning of the phase signal. First, m successive values are accumulated, where m, as described before, is the number of consecutive repetitions of one bit within one pattern:

$$A_P[q] = \sum_{n=0}^{m-1} S_\Phi[u + p + mq], q = 0, 1, \ldots, n - 1 \tag{10}$$

$A_p[q]$ is the sum of m consecutive phase-shifted signal values of one phase-sifted signal $S_\Phi$ for position p and signature bit q, wherein $S_\Phi$ is the phase signal after the phase detection step, i.e. $S_0$, $S_{90}$, $S_{100}$ or $S_{270}$, wherein q is the index for n (the number of bits per signature), wherein u is the index for the sum, accumulating for each combination of position p and signature bit q "m" consecutive phase-shifted signal values of the phase signal $S_\Phi$.

In a next step, the mean value is subtracted from $A_p[q]$ and the absolute value is generated and the sum $F_p$ for each position p is calculated.

$$F_p = \sum_{q=0}^{n-1} \left| A_P[q] - \frac{1}{n} \sum_{a=0}^{n-1} A_P[a] \right| \tag{11}$$

The measure $F_p$ identifies how good the signature bit starting position p fits to the real starting position or offset. Now, the trace is shifted one value (p=1) and the fitting value $F_p$ is calculated again, and so on. This is done m times. The starting position with the best fitting, i.e. the maximum value, will be used for selecting the right summed signal $A_p$ for the further processing, e.g. for quantization (Step S5) and comparison with the given watermarks. In the following the summed signal will also be referred to as offset signal.

The decoding or quantization (step S5) for the offset signal $A_p$ is performed like in the original method by comparing the sample values of $A_p$ with the mean value of $A_p$.

The comparison of the decoded signature 616 with given watermarks can again be performed by bit wise comparison.

Alternatively to selecting the aforementioned summed signal $A_p$ as offset signal, one can also select a sequence of values of $S_\phi$ associated to any position and preferably associated to a last position of said m repetitions of each signature bit to reduce the impact of the aforementioned fading out.

Although the described embodiments comprised five steps, S1 to S5, alternative embodiments can also comprise, e.g., only steps S1 to S5, or steps S1, S2, S4 and S5.

Although a particular method for processing the measured signal has been presented, other method based on bit synchronization, for example, based on phase locked loops and/or correlation and matched filters can also be applied to detect the watermark.

In other words, the aforementioned embodiments described a method for detecting a watermark of an electronic circuit, wherein a voltage or a temporal course of a voltage is measured and wherein the steps of processing the measured voltage or temporal courses of said voltage can comprise the following steps: sampling said measured signal to obtain a sampled signal, quantizing said sampled signal to obtain a quantized sequence of bits and wherein a step of comparing comprises a bit-wised comparison of said quantized sequence of bits with a watermark, wherein said watermark is provided as a given sequence of bits.

Another embodiment of the method based on watermark bit sequence comprises the steps determining a clock frequency (612) of a clock of said electronic circuit, sampling (S1) said measured signal (614) at a predefined multiple of said determined clock frequency (614) to obtain a sample signal (620), differentiating (S2) said sample signal (620) to obtain a differential signal (622), dividing-up (S4) said differential signal (622) into a predefined number of phase shifted signals, said predefined number of phase shifted signals being equal to said predefined multiple of said determined clock frequency, such that each phase shifted signal represents a sub-set of said differential signal (622) having a specific phase shift relative to said clock, calculating (S4) a mean value for each phase shifted signal sequence, selecting (S4) a phase sequence (626) from said multiple phase sequences, said selected phase signal having a maximum mean value, and quantizing (S5) said selected phase by applying a value of "0" to all values of said selected phase signal (626), which are smaller than said mean value of said selected phase signal and by applying a value of "1" to all values of said selected phase signal, which are equal to or higher than said mean value of said selected phase signal.

A preferred embodiment of the inventive method, wherein said watermark is a sequence of bits, wherein said measured signal depends on said sequence of bits over time and wherein each bit of said sequence of bits is repeated a predefined number of times before proceeding to a next bit of said sequence of bits during a generation of said signal, comprises additionally at step S4 a step of finding the right starting position for one bit and determining a respective offset signal, e.g. the resulting summed signal $A_p$, for quantizing in the case when the signature bits are spread.

For experimental results, two FPGA-Boards, a Digilent Spartan-3 Starter Board, as described by Digilent, Inc. in "Spartan-3 board. S3BOARD.cfm.", available at: www.digilentine.com/info, in the following referred to as [13], and a board with a Xilinx Virtex II XC2V250 FPGA were used. On the second board, many other components, like an ARM micro controller or interface chips are integrated to demonstrate that the algorithm is also working on multichip boards. The Spartan-3 board operates with a clock frequency of 50 MHz, the Virtex II board with 74.25 MHz.

On both boards, the voltage is measured on the back of the printed circuit board directly on the via which connects the FPGA with the power plane of the printed circuit board. A 50 Ohm wire with a 50 Ohm terminating resistor were used. This wire is directly soldered on the vias. A DC block element and a 25 MHz high pass filter have been used to filter the DC component and the interferences of the switching voltage controller. A LeCroy Wavepro 7300 scope with 20 Giga Samples per second was used to measure the voltage. The voltage amplitude of the measured switch peak is very small, so a digital enhanced resolution filter to improve the dynamics was used at the cost of a decrease in bandwidth. The signal of the length of 200 µs is recorded on the internal hard disc of the scope. This signal file is transferred to a personal computer and analyzed there.

The functionality of the aforementioned embodiments of the invention are evaluated with a DES Core with 56 Bit from opencores.org. as described by Opencores.org. in "Basic des crypto core: Overview. overview.", available at: www.opencores.org/projects.cgi/web/basicdes, in the following referred to as [14], and an arithmetic coder core. After the synthesis step, only 16 out of 715 lookup tables from the DES56 core have been transformed into SRL16 and a 32 Bit signature has been added. Also, for the arithmetic coder core, 92 out of 1332 lookup tables have been transformed into SRL16. Both core inputs were stimulated with a pseudo random sequence, generated by a linear feedback shift register to simulate input data.

Figure 10:
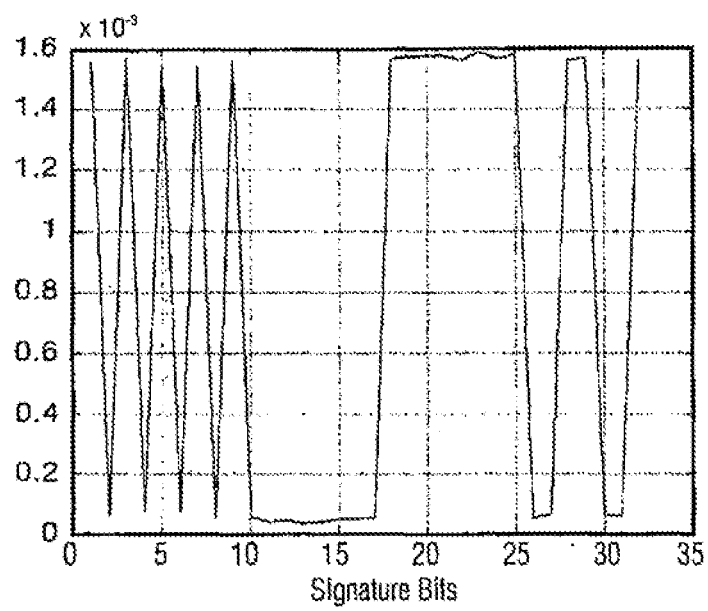
FIG. 10 shows an exemplary good signal for bit decisions during quantization with an SNR (signal-to-noise ratio) value of 37 dB.
Figure 11:
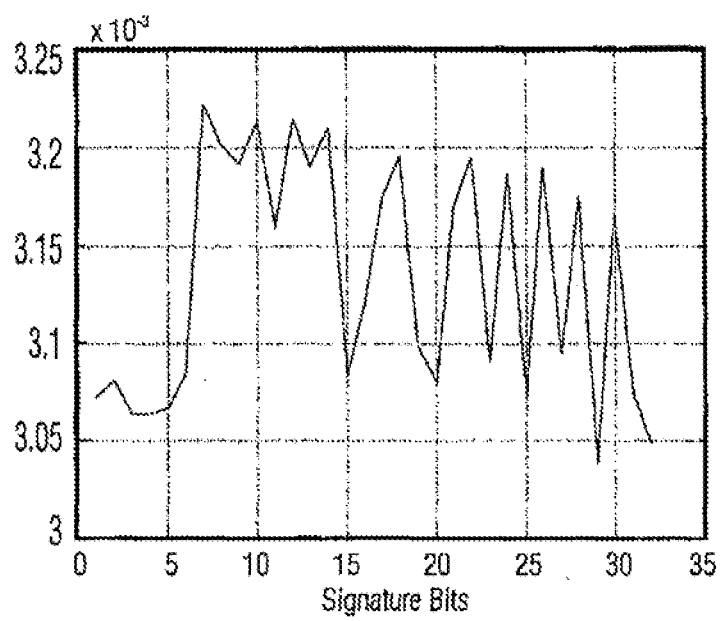
FIG. 11 shows an exemplary signal of lower quality for a Bit decision during quantization with a SNR of 9 dB, but still without Bit errors.

The decoded sequence was compared with the encoded signature from the core to evaluate the bit error rate. Further from the signal, wherein the bit decision is done, two quality indicators were calculated. One is the signal to noise ratio (SNR) of these signals. Because a threshold decision is made, SNR values under 4 dB are difficult to decode. Also, the SNR from the decoded sequence is calculated, so bit errors falsified the SNR. In these cases, the real SNR is lower than the calculated SNR. The second indicator called bit gain is the difference from the mean level of the bits and the threshold level. This indicator shows how big the difference of the voltage swing between ones and zeros of the signature is. Also, the root mean square (RMS) from the recorded signal without the DC part is measured. FIG. 10 shows a good signal 616 (see FIG. 6) before the bit decisions with an SNR value of 37 dB. The signal 616 (see FIG. 6) shown in FIG. 11 is of lower quality and has a SNR of 9 dBs, but still causes no bit errors.

First, the original method described first is evaluated (see FIG. 12). The signature was decoded with both boards and the DES56 core where only 16 lookup tables are transformed into SRL16. Two cases were evaluated, one where only the watermarked core is implemented (case A) and one where the watermarked core and the original core is implemented to check the functionality of the watermarked core (case B). This is done by connecting both cores to the same pseudo random input data and comparing the output when the cores are not in the reset state. Three signatures ($S_1$, $S_2$, $S_3$) were embedded in the core. The Signature $S_1$ is "5C918CBA" and represents a realistic random signature. Signature $S_2$ is "333333333" and signature $S_3$ is "FF335500". With these signatures, the decoding method with different bit toggle rates is evaluated.

In case A, the detection works better than in case B. In case B, more logic is used, but this logic is in the reset state. Nevertheless, the clock tree is still active, which can be seen in the higher signal RMS value. The signature $S_3$ is difficult to decode, because there are many equal bits lumped together and so the printed circuit board works as a resonator.

FIG. 12 shows that a decoding is not always working without bit errors, but here, only 16 lookup tables were transformed into SRL16.

To evaluate the enhanced robustness method, i.e. the method with spread watermarks, the same test cases are used and only the signature $S_3$ is implemented, which is harder to decode (see FIG. 13). Also, two additional test cases are defined. In C, the unwatermarked core has an inverted reset, so the core is working when the watermark is sending the signature. In D, two cores are working, while the signature is emitted. Not all combinations in D are possible, because the FPGA is too small for three cores. Additionally, this method was evaluated with the arithmetic coder core.

FIG. 13 shows that the detection of the watermarked signature works much better than with the original method. The decoding for the DES56 core works fine even if one or two of the same DES56 cores operate at the same time the signature is emitted. Also here, only 16 SRL16 in the DES56 core are used. For the arithmetic coder core, more lookup tables are used and if no other core operates, the decoding is better than for the DES56 core, but if another arithmetic coder core is active, the decoding is impossible. The signal RMS indicates that the arithmetic coder core has a very high toggle rate.

In FIG. 14, the recording length was decreased to see the impact of the quality of the results. This is done with the DES56 core in all four cases. The quality degenerates, but with the recording length of 50 µs, it is still possible to detect the watermark without bit errors in case D even if two other cores are simultaneously active.

Although the aforementioned embodiments measured a voltage, the invention is not limited to this embodiment. The watermarking signal generated by the watermarking signal generator can be measured at the power supply, for example, by direct contact probes or contactless probes, for example, capacitive or inductive probes or, in general, by measuring changes of the electromagnetic field over time, i.e. measuring an electromagnetic pattern, which corresponds to the watermark. The electromagnetic pattern can be measured with an electromagnetic probe, wherein the signal processing can, e.g., be derived from the methods described for processing power or voltage signals.

A watermarking technique for electronic circuits, and especially for IP cores, for example, for FPGA or ASIC has been presented and discussed in detail based on an embodiment for FPGA cores. An embodiment based on FPGA cores, where the signature is easily extracted over the power pins of the FPGA, has been described in detail. It has been shown that it is possible to read out the watermark only with the given device and without further information from the vendor of the product. It has also been shown how the watermark can be easily integrated into the core. With Xilinx FPGAs, it is possible to integrate the watermark algorithm and the signature into the functionality of the core, so it is hard to remove the watermark. Only very few additional resources were required for the watermark control. Furthermore, detection algorithms have been described and experimental results showed that the functionality of the core is not altered and that it is possible to detect the signature over the power trace of the FPGA. Also, an enhanced robustness technique has been introduced, which highly improves the decoding of the signature. With this enhanced decoding method, one is able to decode the signature even if other cores are simultaneously active on the same hardware device. Furthermore, quality indicators were introduced to evaluate the result of the decoded signature. With these indicators, it was shown how reliable the technique is.

The experimental results have shown that decoding is not possible in all cases, but one can improve the quality of the results if more lookup tables are transformed into shift registers or the recording time is extended. Also, the signature width can be increased and, so, a higher number of signatures, error codes and cyclic redundancy checks (CRC) are possible.

Depending on certain implementation requirements of the inventive methods, the inventive methods can be implemented in hardware or in software. The implementation can be performed using a digital storage medium, in particular a disk, DVD or a CD having electronically readable control signals stored thereon, which cooperate with a programmable computer system such that the inventive methods are performed. Generally, the present invention is, therefore, a computer program product with a program code stored on a machine-readable carrier, the program code being operative for performing the inventive methods when the computer program product runs on a computer. In other words, the inventive methods are, therefore, a computer program having a program code for performing at least one of the inventive methods when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A watermarking apparatus for an electronic circuit, comprising:
   a watermark memory operative to store a watermark characterizing said electronic circuit; and
   a watermarking signal generator operative to generate based on said watermark a watermarking signal on a power supply line of said electronic circuit, wherein said watermarking signal is detectable for a recognition of said watermark;
   wherein said electronic circuit is operative to change into a watermarking signal generation mode based on a given event and wherein said watermarking apparatus further comprises: a watermarking signal control, operative to initiate said generation of said watermarking signal by said watermarking signal generator when said electronic circuit is in, or changes into, said watermarking signal generation mode; and
   wherein said watermark memory or said watermark signal generator is part of a functional logic of said electronic circuit when said electronic circuit is in another mode than the watermarking signal generation mode.

2. The watermarking apparatus according to claim 1, wherein a power consumption of said watermarking signal generator depends on a value of said watermark stored in said watermark memory, and wherein said watermarking signal depends on said power consumption of said watermarking signal generator.

3. The watermarking apparatus according to claim 1, wherein said stored watermark is a sequence of bits of a predetermined length, wherein said watermarking signal generator is operative to receive said stored watermark as a sequence of bits over time, and wherein a temporal course of said watermarking signal depends on said sequence of bits over time.

4. The watermarking apparatus according to claim 3, comprising:
   a repeating unit, operative such that said watermarking signal generator receives a bit of said sequence of bits a predefined number of times before receiving a next bit of said sequence of bits.

5. The watermarking apparatus according to claim 3, wherein said watermark memory or said watermarking signal generator is a shift register.

6. The watermarking apparatus according to claim 1, wherein said watermarking signal is a voltage signal.

7. The watermarking apparatus according to claim 1, wherein the electronic circuit is an integrated circuit.

8. The watermarking apparatus according to claim 1, wherein the electronic circuit is a FPGA (field programmable gate array) or an ASIC (application specific integrated circuit).

9. The watermarking apparatus according to claim 1, wherein said electronic circuit has been implemented using a software and preferably using an intellectual property core (IP core).

10. A program embodied in a hardware computer-readable storage medium configured for enabling a design or implementation of an electronic circuit comprising:
    a watermark memory operative to store a watermark characterizing said electronic circuit; and
    a watermarking signal generator operative to generate based on said watermark a watermarking signal on a power supply line of said electronic circuit, wherein said watermarking signal is detectable for a recognition of said watermark;
    wherein said electronic circuit is operative to change into a watermarking signal generation mode based on a given event and wherein said watermarking apparatus further comprises: a watermarking signal control, operative to initiate said generation of said watermarking signal by said watermarking signal generator when said electronic circuit is in, or changes into, said watermarking signal generation mode; and
    wherein said watermark memory or said watermark signal generator is part of a functional logic of said electronic circuit when said electronic circuit is in another mode than the watermarking signal generation mode.

11. A method for detecting a watermark of an electronic circuit, wherein said watermark characterizes said electronic circuit, comprising the steps of:
    measuring a signal applied to a power supply line of said electronic circuit;
    processing said measured signal; and
    comparing said processed signal with one or a plurality of given watermarks;
    wherein said electronic circuit changing into the watermarking detecting mode based on a given event and wherein a watermarking signal control, operative to initiate said watermark detecting of said signal when said electronic circuit is in, or changes into, said watermarking detecting mode; and
    wherein a watermark memory or said watermark detecting is part of a functional logic of said electronic circuit when said electronic circuit is in another mode than the watermarking detecting mode.

12. The method according to claim 11, wherein said measured signal is a voltage signal or a temporal course of said voltage signal.

13. The method according to claim 11, wherein the processing comprises the following steps:
    sampling said measured signal to obtain a sample signal; and
    quantizing said sample signal or a processed version thereof to obtain a quantized signal; and
    wherein the step of comparing comprises a bit wise comparison of said quantized signal with said watermarks, and wherein said watermarks are provided as sequences of bits.

14. The method according to claim 11, wherein the processing comprises the following steps:
    determining a clock frequency of a clock of said electronic circuit;
    sampling said measured signal at a predefined multiple of said determined clock frequency to obtain a sample signal;
    differentiating said sample signal to obtain a differential signal;
    dividing-up said differential signal into a predefined number of phase shifted signals, said predefined number of phase shifted signals being equal to said predefined multiple of said determined clock frequency, such that each phase shifted signal represents a sub-set of said differential signal having a specific phase shift relative to said clock;
    calculating a mean value for each phase shifted signal sequence;
    selecting a phase sequence from said multiple phase sequences, said selected phase signal having a maximum mean value; and
    quantizing said selected phase by applying a value of "0" to all values of said selected phase signal, which are smaller than said mean value of said selected phase signal and by applying a value of "1" to all values of said selected phase signal, which are equal to or higher than said mean value of said selected phase signal.

15. The method according to claim 14, wherein said measured signal is based on a given number of repetitions of said watermarking signal applied to said power supply line, and wherein the step of processing further comprises the following step:
    accumulating corresponding values of said repetitions in said differential signal signal and dividing said accumulated values by a said given number of repetitions to obtain an accumulated signal, which can be further processed like said differential signal.

16. The method according to claim 14, wherein said watermark is a sequence of bits, wherein said measured signal depends on said sequence of bits over time and wherein each bit of said sequence of bits is repeated a predefined number of times before proceeding to a next bit of said sequence of bits during a generation of said signal and wherein the step of phase detection further comprises:
    selecting an offset signal for quantizing, wherein the offset signal comprises summed values associated to said repetitions of said watermark sequence of bits.

17. An apparatus for detecting a watermark of an electronic circuit, wherein said watermark characterizes said electronic circuit, comprising:
- a measurer, implemented in hardware, for measuring a signal applied to a power supply line of said electronic circuit;
- a hardware processor for processing said measured signal; and
- a comparer, implemented in hardware, for comparing said processed signal with one or a plurality of given watermarks;
- wherein said electronic circuit changing into the watermarking detecting mode based on a given event and wherein a watermarking signal control, operative to initiate said watermark detecting of said signal when said electronic circuit is in, or changes into, said watermarking detecting mode; and
- wherein a watermark memory or said watermark detecting is part of a functional logic of said electronic circuit when said electronic circuit is in another mode than the watermarking detecting mode.

18. A computer program implemented in a hardware computer-readable storage medium having a program code for performing a method for detecting a watermark of an electronic circuit, wherein said watermark characterizes said electronic circuit, comprising the following steps:
- measuring a signal applied to a power supply line of said electronic circuit;
- processing said measured signal; and
- comparing said processed signal with one or a plurality of given watermarks;
- wherein said electronic circuit changing into the watermarking detecting mode based on a given event and wherein a watermarking signal control, operative to initiate said watermark detecting of said signal when said electronic circuit is in, or changes into, said watermarking detecting mode; and
- wherein a watermark memory or said watermark detecting is part of a functional logic of said electronic circuit when said electronic circuit is in another mode than the watermarking detecting mode.

* * * * *